INVENTORS
NEIL SULLIVAN
FREDERICK A. SUMMERLIN
BY
ATTORNEY

United States Patent Office 3,315,255
Patented Apr. 18, 1967

3,315,255
AIRCRAFT TERRAIN AVOIDANCE APPARATUS
Neil Sullivan and Frederick Arthur Summerlin, Isleworth, England, assignors to The Sperry Gyroscope Company Limited, Brentford, England, a British company
Filed Feb. 9, 1959, Ser. No. 792,223
Claims priority, application Great Britain, Feb. 7, 1958, 4,092/58
4 Claims. (Cl. 343—7)

This invention relates to aircraft control apparatus for enabling an aircraft to be flown at a more or less constant low altitude, say 500 feet over land without striking obstacles.

According to the invention an aircraft control apparatus includes an altimeter arranged to provide a first signal which is a function of the height of the aircraft, a radar equipment arranged to provide a measure of the range of the nearest obstacle in a forward direction lying within at least a few degrees on either side of a substantially vertical plane including the line of travel of the aircraft, and pitch control apparatus for the aircraft arranged to be generated at least partly in dependence upon the said first signal and partly in dependence upon the said measure, the sense of the control applied in dependence upon the measure being such as to cause the aircraft to pitch upwardly to avoid the obstacle.

Preferably the altimeter comprises a radar altimeter arranged to provide the said first signal, this signal being a function of the height of the aircraft above the mean level of the ground directly below the aircraft.

Conveniently the radar equipment provides a measure of the range of the nearest obstacle in a forward direction which lies within ten degrees on either side of the plane including both the yaw axis and the roll axis of the aircraft.

In this way even if the nearest obstacle is not directly in line with the centre of the radar beam, signals denoting its presence will be received by the apparatus, and control applied to avoid the obstacle. Thus when the aircraft has a lateral component of velocity due to a strong cross wind, the risk of striking an obstacle to one side of the aircraft heading is reduced.

It is of advantage if the radar equipment is arranged to generate an obstacle warning signal when the range of the nearest object in the forward direction is less than a predetermined threshold range, and if the magnitude of the obstacle warning signal is dependent upon the difference between the threshold range in the direction of the nearest object and the range of the said nearest object. This obstacle warning signal may be used to provide the measure of the range of the nearest obstacle.

In one form of the invention, the pitch control apparatus is arranged to be operated at least partly in dependence upon an integral of the said obstacle warning signal. In this way the signal supplied to the pitch control apparatus increases steadily as long as an obstacle warning signal is present.

Preferably the radar equipment is arranged to measure the range of the nearest obstacle in a number of forward directions lying within at least a few degrees on either side of a substantially vertical plane including the line of travel of the aircraft.

The radar equipment may be arranged to scan through an angle in the plane including the aircraft roll and yaw axes and to measure the range of the nearest obstacle at different angles relative to the roll axis of the aircraft.

A selector may then be arranged to select the greatest one of the obstacle warning signals for the different directions. Conveniently the threshold range in each direction of the number of forward directions is greater than the distance in that direction between the aircraft and the locus of points lying on a predetermined climbing flight of the aircraft. This predetermined flight path may be a curved path in which the aircraft is subjected to constant acceleration along the radius of the curve.

Conveniently the signal provided to the pitch control apparatus by the altimeter is dependent upon the difference between the actual height of the aircraft and a certain set height. It is of advantage if the control apparatus is arranged to be operated in part dependence upon a signal dependent upon an integral of the altitude error. It is also of advantage if the pitch control apparatus includes means limiting the effect of the said first signal to a small angular change in pitch for example 2° or 3°. This limitation will help to avoid overstressing the aircraft structure when it is flying over very undulating land.

It is important that when an obstacle has been surmounted and passed, and there is no other obstacle warning signal the obstacle avoidance signals applied to the control apparatus should decay and the aircraft be returned to the set height. This could be done by using the same integrator to integrate the obstacle warning signal as is used for integrating the altitude error signal.

It is desirable that the radar equipment should be pitched up or down with the aircraft, for not only is this the simplest arrangement as the radar reference can be fixed in relation to the aircraft, but there is the additional advantage that as the aircraft is put into a climb to surmount an obstacle, the radar equipment pitches upwards and measures the distance to the obstacle at what is for the equipment a new angle, at which the threshold range is smaller than before the aircraft was put into a climb. This means that if the aircraft were to pitch up too quickly, the equipment could cease to indicate the presence of an obstacle within the threshold range, and the control system would then operate to level the aircraft again. Thus, the feature operates as an automatic control to prevent the path of the aircraft from being curved upwards too sharply, and this enables the use of relatively strong control from the obstacle warning system when an obstacle comes within the threshold range.

The invention may be put into practice in various ways and one embodiment thereof will now be described, by way of example only, as applied to an automatic control system arranged to manoeuvre an aircraft to avoid obstacles lying in the aircraft flight path while maintaining the aircraft upon a flight path which, in general, is at an altitude of about 500 feet above mean ground level.

Reference will be made to the accompanying drawings in which.

Figure 1:
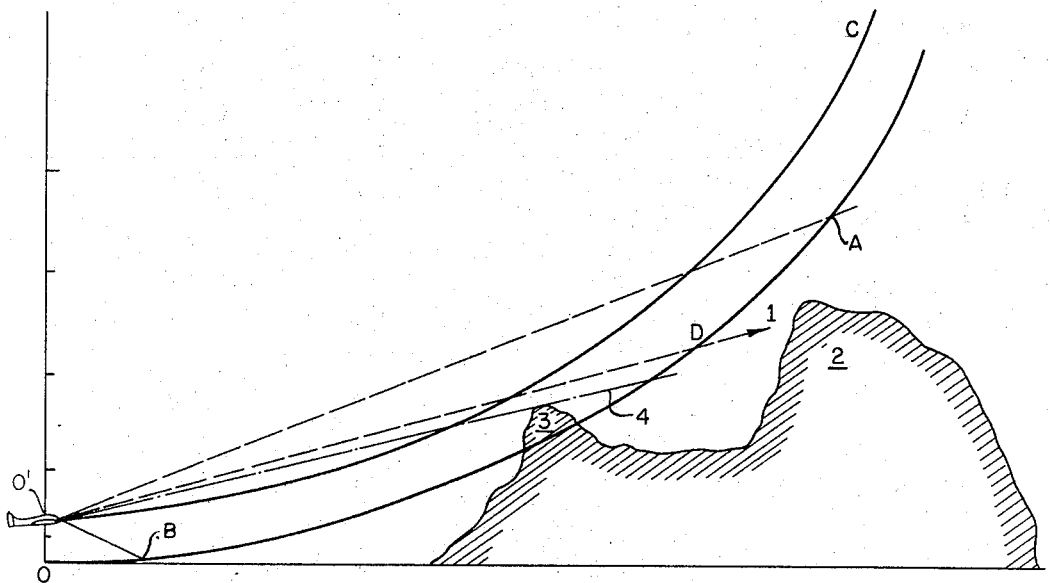
FIGURE 1 is a diagram of a curved climbing flight path in which the aircraft would experience a constant acceleration along the radius of the curved path.

The aircraft automatic control apparatus includes radar equipment arranged to be directed forwardly to detect obstacles in the aircraft's expected flight path, and also from time to time, to be directed downwardly from the aircraft at right angles to the roll axis to provide a measure of the altitude of the aircraft above the mean ground level. The radar equipment is scanned through an angle forward of the aircraft AO'O (FIG. 1) repeatedly at least once in every few seconds.

When the radar equipment is directed vertically downwards it is arranged to generate an electrical signal which is proportional to the difference between a settable altitude, say 500 feet, and the actual altitude as measured by the radar equipment. This signal which will be termed the "height-error-signal," is supplied to actuate the pitch control apparatus of the aircraft.

When the radar equipment is directed along a line within the angle AO'B, it is arranged to measure the range of the nearest obstacle in a general direction along the line and to produce an electrical signal corresponding to this range. The angular width of the radar beam, measured in a plane containing the line and the pitch axis of the aircraft, is arranged to be about 10° on either side of the line.

In the apparatus, range signals are obtained for each of a number of discrete directions contained within the angle AO'B. Each range signal is compared with a signal whose magnitude is dependent upon the threshold range in the direction to which the signal corresponds, and an obstacle warning signal is obtained which is proportional to the difference between the said threshold range and the range of the nearest obstacle. No signal is generated if the obstacle is beyond the threshold range, but a signal is generated as soon as an obstacle comes within the threshold range. The obstacle warning signal becomes greater as the obstacle moves, in relation to the threshold range, towards the aircraft. A signal dependent upon the biggest of the warning signals generated is applied also, to actuate the pitch control apparatus. The threshold range may be determined arbitrarily, but one method of determining it is described below with reference to FIGURE 1.

The curve O'C is a circular arc which is horizontal at the aircraft, and curves upwards in the direction of flight to represent a climb path in which the aircraft would experience a constant acceleration along the radius of the arc. This acceleration may be, say, twice the acceleration due to gravity, so that if the aircraft does not deviate very much from this path when it climbs, the crew will not be put to any great discomfort, and the airframe will not be unduly stressed.

The curve OA is concentric with O'C but is horizontal at ground level immediately below the aircraft, so that the distance O'O represents the set altitude of 500 feet. If the curve OA were to define the threshold range, that is to say, if the threshold range for any direction 1 of the radar equipment is equal to the distance from the aircraft to the curve OA in that direction (this distance (O'D) will be called L), then any obstacle beyond the curve such as 2, is arranged not to give an obstacle warning signal when the radar equipment is directed at it.

However, an obstacle 3 which is within the threshold range will cause an obstacle warning signal to be generated equal in magnitude to the intrusion of the obstacle within the threshold range i.e. equal in magnitude to the distance 4 from the front of the obstacle facing the aircraft to the threshold range in the direction concerned. This obstacle warning signal is proportional to $L-d$ where $d$ is the range of the nearest obstacle in the direction. As stated above, a signal dependent upon the obstacle warning signal is fed into the pitch control apparatus of the aircraft.

It will be appreciated that different control equations may be used in the pitch control apparatus, and one suitable control equation which may be used to cause the aircraft to follow a flight path which avoids obstacles is:

$$\lambda = K_1\left(\theta + \frac{(h_o - h)}{K_2} + \frac{1}{K_2 T_{1_p}}(h_o - h) - \frac{1}{K_3 T_{2_p}}(L - d)\right)$$

where $\lambda$ represents the deflection to be imparted to the elevator, $\theta$ represents the actual angle of pitch of the aircraft, and where $K_1$, $K_2$, $K_3$, $T_1$, and $T_2$ are constants.

From the equation it can be seen that the deflection of the control surface is proportional to the sum of the pitch angle of the aircraft, a measure of the height error $(h_o - h)$, an integral of the height error (as suggested by the integrating operator $1/p$), and an integral of the obstacle warning signal $(L - d)$.

As suggested above, in the preferred embodiment, the second and third terms in this equation are obtained from the radar equipment while it is downwardly directed, and the fourth term obtained from the radar equipment while it is forwardly directed.

Figure 2:
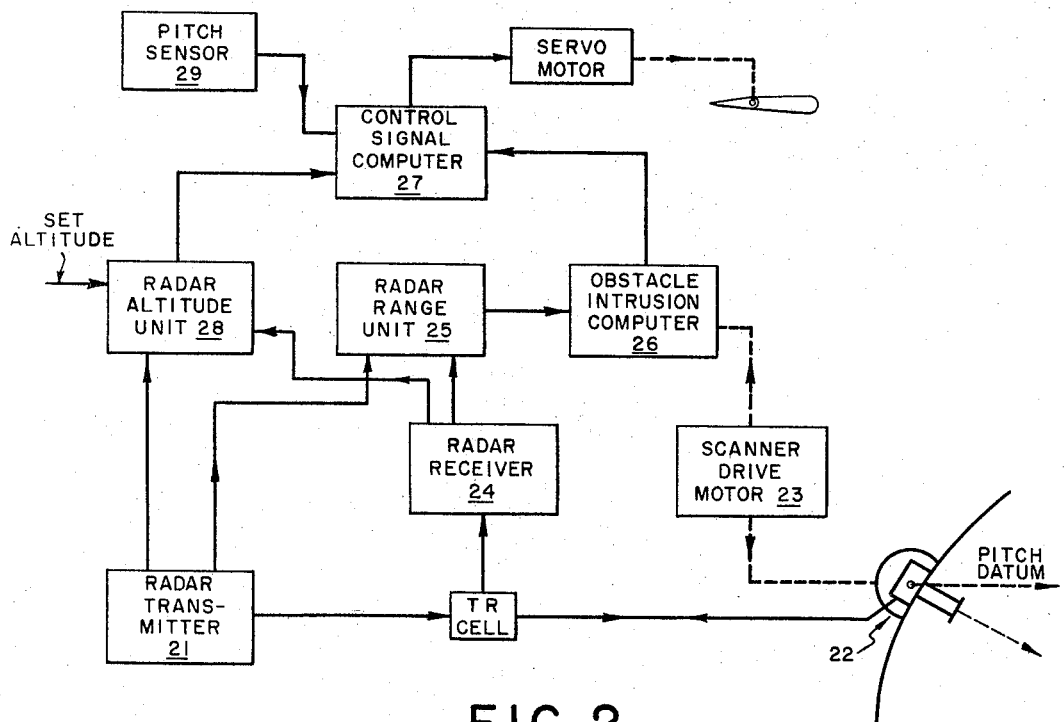
FIGURE 2 is a block diagram of the automatic control apparatus.

Signals from a radar transmitter 21 (FIG. 2) are passed to a radar antenna 22 which is driven by a scanner drive motor 23 to scan through an angle forward of the aircraft, the center of scan corresponding, approximately, to the fore and aft axis of the aircraft. Antenna 22 also is driven by motor 23, once every scanning cycle, to be directed downwardly from the aircraft at right angles to the aircraft roll axis. Reflected signals picked up by the radar antenna 22 are sensed by a radar receiver 24, and passed by the receiver to a radar range unit 25.

In the radar range unit the time interval between the time of transmission of a radar pulse and the time of receipt of any corresponding reflected pulse is determined and an electrical signal is generated whose magnitude is proportional to this time interval. This electrical signal, whose magnitude is proportional to the range from the aircraft of the object reflecting the transmitted pulse, is then fed to an obstacle intrusion computer 26. So, as the radar scanner is scanned through its angle of scan, the obstacle intrusion computer receives a series of signals, these signals corresponding to the range of the nearest reflecting objects at the different angles within the angle of scan of the radar antenna, when an obstacle is found forward of the aircraft and within a range corresponding to the pulse repetition rate of the radar transmitter 21.

Figure 3:
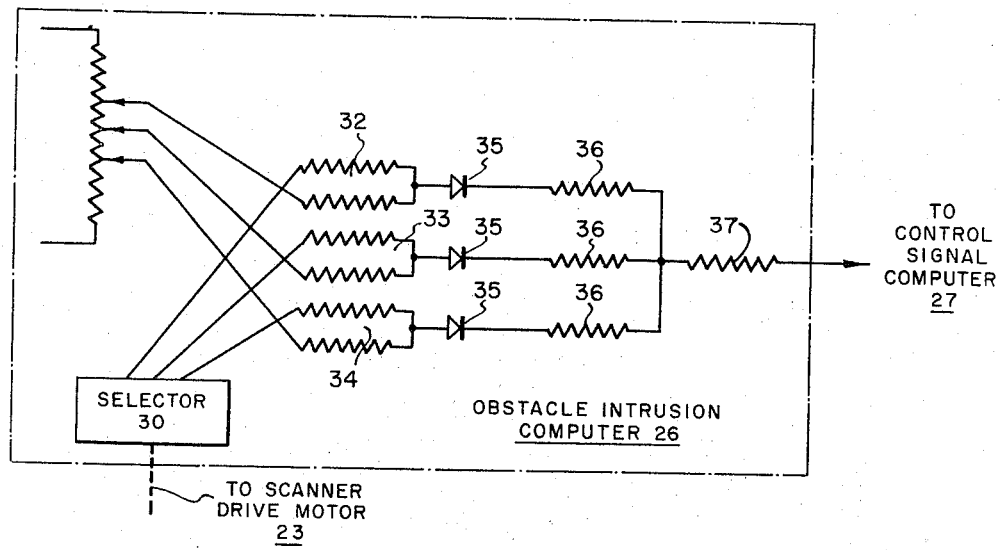
FIGURE 3 is a schematic diagram of an obstacle intrusion computer forming part of the control apparatus of FIGURE 2.

In the obstacle intrusion computer 26, range signals corresponding to different ones of a number of different elevation angles within the angle of scan of the antenna are selected by means of a selector 30 (FIG. 3) including a rotary switch (not shown) driven by the scanner drive motor 23, and the magnitude of each selected signal compared with a value which corresponds to the threshold range at its associated elevation angle to provide an obstacle warning signal i.e. a signal proportional to $(L-d)$.

This comparison is made by feeding each of the different selected signals along a different one of a number of channels 32, 33, 34. Every channel consists of two parallel resistors connected in series with a rectifier 35 and a resistor 36. The ends of the resistors 36 remote from the rectifiers 35 are each connected to one end of a single resistor 37. The obstacle warning signal for a particular elevation angle is fed into one of the parallel resistors of the appropriate channel and a preset signal representing the calculated threshold range is fed into the other parallel resistor of that channel. In this way, a rectifier 35 only passes a signal when the range of the nearest obstacle is less than the threshold range, that is, when the obstacle warning signal is greater than the associated preset signal. The rectifiers also ensure that only the greatest of all the different obstacle warning signals is fed through the resistor 37 to a control signal computer 27.

The reflected signals received by the receiver when the radar antenna 22 is directed downwardly from the aircraft are passed to a radar altitude unit 28. In the altitude unit the time interval between the time of transmission of a radar pulse and the time of receipt of the corresponding reflected pulse is determined and an electrical signal is generated whose magnitude is dependent upon the height of the aircraft. This signal is compared with a preset signal representing the height above mean ground level at which it is desired that the aircraft be maintained in the absence of any obstacles, and any resulting height error signal is fed to the control signal computer 27.

The control signal computer is also supplied with a signal which is proportional to the pitch angle of the aircraft. This signal is provided by a pitch sensor 29.

From the signal imputs supplied to the control signal computer 27, a pitch control signal is derived which is fed to a servo motor which actuates the aircraft elevators in such a manner as to cause the aircraft to follow a flight path—roughly corresponding to the path O′C (FIG. 1)—which avoids the obstacles.

As stated above, in the preferred embodiment, the control signal applied to deflect the elevators is proportional to the sum of a measure of the pitch angle of the aircraft, a measure of the height error, an integral of the height error, and an integral of the obstacle warning signal.

Figure 4:
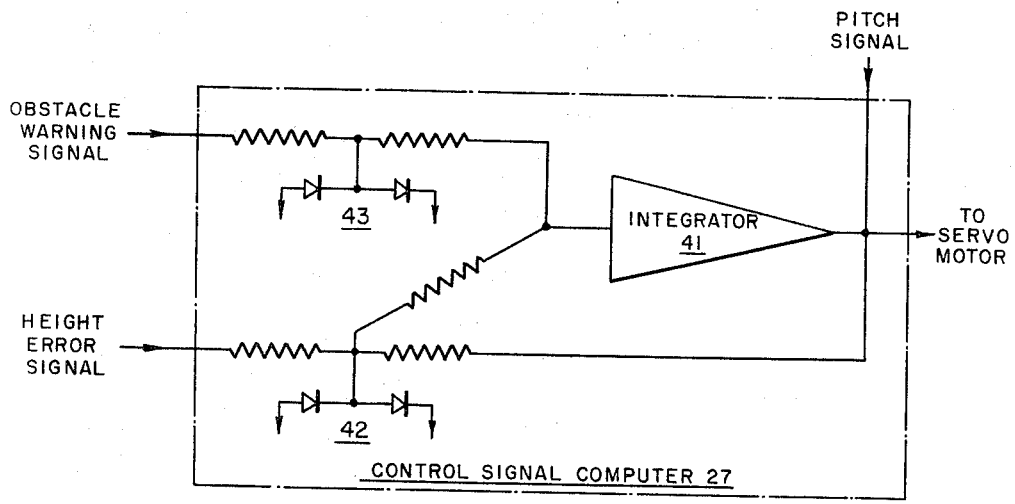
FIGURE 4 is a schematic diagram of a control signal computer also forming part of the control apparatus of FIGURE 2.

By integrating the largest of the obstacle warning signals the signal supplied to control the elevators is caused to increase steadily as long as an abstacle warning signal is present. When, however, the obstacle has been surmounted and there is no other obstacle warning signal the control signal decays away to zero. This is ensured by using the same integrator 41 (FIG. 4) to integrate the obstacle warning signal as is used to integrate the height error signal. Thus the integrater 41 in the control signal computer generates the sum of the third and fourth terms of the equation given above, and does not generate them separately. Once the obstacle warning signal becomes zero, or small, the altitude error signals apply control to change the pitch of the aircraft to bring the aircraft once more down to the set height above mean ground level.

The time integral of the obstacle warning signal may be made proportional to the elevation angle of the obstacle which has intruded most inside the threshold range by suitably grading resistors 36 (FIG. 3) of the obstacle intrusion computer.

A signal limiter 42 is included in the control signal computer 22 in order to limit the effect of the height error signal to a small angular change in pitch in order to avoid overstressing the aircraft structure when it is flying over undulating land. This is done by limiting the height error signal to such a value that at no time can it be such as to allow control to be applied sufficient to stress the aircraft to a degree greater than plus or minus half the acceleration due to gravity.

A further limiter 43 is also included in the control signal computer limiting the obstacle warning signal to a maximum value so that any ensuing control does not result in a stress being applied to the aircraft which is greater than twice the acceleration due to gravity.

It will be appreciated that for the aircraft to follow the path O′C an obstacle warning signal must be generated and has to grow, so that in fact the aircraft will follow a path which is lower and further to the right than O′C and thus the aircraft might not clear the obstacle by the set 500-feet. However, the difficulty is met by selecting a threshold range which is displaced to the right of the curve OA by a small amount. The optimum amount of this displacement depends upon particular aircraft, in which the apparatus is fitted, but it is not critical and best determined empirically.

As the aircraft descends behind the obstacle and approaches the set height, the control signals applied to actuate the elevators due to the height error signal will steadily decrease and the pitch aircraft will gradually be brought back to the pitch required to maintain the aircraft at the set height. If however the aircraft approaches the set height too rapidly, with a large downward pitch angle, the radar system will again generate obstacle warning signals due to reflection taking place from the ground. These signals will act to apply control to the elevators to bring the nose of the aircraft up and so help to ensure that the flight path of the aircraft does not lie below the set altitude.

Of course, if the aircraft approaches a second obstacle before the set height is reached, i.e. while control is being applied to bring the aircraft back to the set height after avoiding a first obstacle, the obstacle warning signals generated will again cause control to be applied to the elevators to cause the aircraft to avoid the on-coming obstacle.

It should be noted that the radar equipment is pitched up and down with the aircraft, for not only is this the simplest arrangement as the radar reference can be fixed in relation to the aircraft, but there is the additional advantage that as the aircraft is put into a climb to surmount an obstacle, the radar equipment pitches upwards and measures the distance to the obstacle at what is, for the equipment, a new angle at which the threshold range is smaller than before the aircraft was put into a climb. This means that if the aircraft were to pitch up too quickly, the equipment would cease to indicate the presence of an obstacle within the threshold range, and the control system would then operate to level the aircraft again. Thus, the feature operates as an automatic control to prevent the path of the aircraft from being curved upwards too sharply, and this enables the use of relatively strong control from the obstacle warning system when an obstacle comes within the threshold range.

In an alternative embodiment of the above control system, the radar scanning antenna is stabilised about the roll axis.

In the system above described, when the aircraft rolls away from the level condition, spurious obstacle signals will be provided by the radar system due to reflections being made on the surface of the ground. These will cause control to be applied to lift the nose of the aircraft. This acts as an added factor to ensure that the aircraft does not descend below the preset height.

What is claimed is:

1. Aircraft control apparatus comprising a radar equipment for scanning an oncoming obstacle and for providing a plurality of output signals each representing the range to said obstacle as measured along a respective angle within said predetermined angle, means for generating a plurality of reference signals each representing a predetermined range as measured along a discrete direction within said predetermined angle, means for comparing each said output signal with a respective one of said reference signals to produce a first control signal when one of said reference signals exceeds the one of said output signals to which it is compared, means for producing a second control signal representing the deviation in height of said aircraft from a predetermined height, pitch control apparatus for causing said aircraft to pitch upwardly to avoid said obstacle in response to input signals, signal integrating means, means for applying said first and second control signals to said signal integrating means, and means for coupling the output of said integrating means to said pitch control apparatus.

2. Apparatus as defined in claim 1 and further including means for generating a third control signal representing the angle of pitch of said aircraft and means for applying said third control signal to said pitch control apparatus.

3. Aircraft control apparatus comprising a radar equipment for scanning an oncoming obstacle through a predetermined angle and for providing a plurality of output signals each representing the range to said obstacle as measured along a respective angle within said predetermined angle, means for generating a plurality of reference signals each representing a predetermined range as measured along a discrete direction within said predetermined angle, means for comparing each said output signal with a respective one of said reference signals to produce a first control signal when one of said reference signals exceeds the one of said output signals to which it is compared, said first control signal having a magnitude proportional to the excess of said one of said reference signals over said one of said output signals, means for producing a second control signal proportional to the deviation in height of said aircraft from a predetermined height, means for generating a third control signal proportional to the angle of pitch of said aircraft, pitch control apparatus for causing said aircraft to pitch upwardly to avoid said obstacle, means for integrating said first and second control signals, means for applying said second and third control signals to said pitch control apparatus, and means for coupling the output of said means for integrating to said pitch control apparatus.

4. Aircraft control apparatus comprising a radar equipment for scanning an oncoming obstacle through a predetermined angle and for providing a plurality of output signals each representing the range of said obstacle as measured along a respective angle within said predetermined angle, means for generating a plurality of reference signals each representing a predetermined range as measured along a discrete direction within said predetermined angle, means for comparing each said output signal with a respective one of said reference signals to produce a first control signal when one of said reference signals exceeds the one of said output signals to which it is compared, means to produce a second control signal representing the deviation in height of said aircraft from a predetermined height, pitch control apparatus for causing said aircraft to pitch upwardly to avoid said obstacle in response to input signals, signal integrating means for applying said first control signal to said pitch control apparatus as one of said input signals, and means for applying said second control signal to said pitch control apparatus as another of said input signals.

References Cited by the Examiner

UNITED STATES PATENTS

| | | | |
|---|---|---|---|
| 2,499,349 | 3/1950 | Ayres | 343—112.4 |
| 2,630,283 | 3/1953 | Hanson | 343—112.4 |
| 2,809,340 | 10/1957 | Bernhart | 343—7 |
| 2,965,894 | 12/1960 | Sweeney | 343—7 |

CHESTER L. JUSTUS, *Primary Examiner.*

FREDERICK M. STRADER, KATHLEEN H. CLAFFY, *Examiners.*

D. G. REDINBAUGH, R. D. BENNETT, R. M. SKOLNIK, T. H. TUBBESING, *Assistant Examiners.*